US012473710B2

(12) United States Patent
Kang

(10) Patent No.: US 12,473,710 B2
(45) Date of Patent: Nov. 18, 2025

(54) CONSTRUCTION MACHINE AND CONTROL METHOD THEREOF

(71) Applicant: HD HYUNDAI INFRACORE CO., LTD., Incheon (KR)

(72) Inventor: Byungil Kang, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 353 days.

(21) Appl. No.: 18/017,728

(22) PCT Filed: Jul. 22, 2021

(86) PCT No.: PCT/KR2021/009514
§ 371 (c)(1),
(2) Date: Jan. 24, 2023

(87) PCT Pub. No.: WO2022/019691
PCT Pub. Date: Jan. 27, 2022

(65) Prior Publication Data

US 2023/0287650 A1 Sep. 14, 2023

(30) Foreign Application Priority Data

Jul. 24, 2020 (KR) ........................ 10-2020-0092351

(51) Int. Cl.
*E02F 3/43* (2006.01)
*E02F 9/22* (2006.01)
(Continued)

(52) U.S. Cl.
CPC ............ *E02F 3/435* (2013.01); *E02F 9/2203* (2013.01); *E02F 9/2217* (2013.01);
(Continued)

(58) Field of Classification Search
CPC ....... E02F 3/435; E02F 9/2203; E02F 9/2217; E02F 9/2267; E02F 9/2275; E02F 9/2296; F15B 1/04; F15B 13/04
See application file for complete search history.

(56) References Cited

U.S. PATENT DOCUMENTS 9,151,018 B2 * 10/2015 Knussman ............ E02F 9/2289
9,261,118 B2 * 2/2016 Zhang ................... F15B 11/006
(Continued)

FOREIGN PATENT DOCUMENTS

CN 202081450 U 12/2011
CN 106662130 A 5/2017
(Continued)

OTHER PUBLICATIONS

The Extended European Search Report dated Nov. 22, 2023 for corresponding European Patent Application No. 21845382.7 (7 pages).

(Continued)

*Primary Examiner* — Saul Rodriguez
*Assistant Examiner* — Brendan P Tighe
(74) *Attorney, Agent, or Firm* — Hauptman Ham, LLP

(57) ABSTRACT

An embodiment of the present disclosure provides a construction machine, which includes a boom, the construction machine including a boom cylinder configured to move the boom upward or downward and includes a head side and a rod side, a boom regeneration valve configured to control a flow rate of a working fluid discharged from a head side of the boom cylinder, an operating device configured to generate an operating signal for operating the boom, an accumulator configured to store the working fluid discharged from the boom cylinder, a regeneration motor configured to produce renewable energy by performing a regenerative operation by using the working fluid discharged from the
(Continued)

boom cylinder or the working fluid discharged from the accumulator, and a control device configured to correct an opening area of the boom regeneration valve on the basis of pressure of the accumulator when the boom descends.

9 Claims, 4 Drawing Sheets

(51) Int. Cl.
*F15B 1/04* (2006.01)
*F15B 13/04* (2006.01)

(52) U.S. Cl.
CPC .......... *E02F 9/2267* (2013.01); *E02F 9/2275* (2013.01); *E02F 9/2296* (2013.01); *F15B 1/04* (2013.01); *F15B 13/04* (2013.01)

(56) References Cited

U.S. PATENT DOCUMENTS

| | | | | |
|---|---|---|---|---|
| 9,290,911 | B2 * | 3/2016 | Ma | F15B 1/024 |
| 9,341,198 | B2 * | 5/2016 | Nakamura | E02F 9/2217 |
| 9,458,604 | B2 * | 10/2016 | Zhang | E02F 9/2292 |
| 9,618,014 | B2 * | 4/2017 | Morris | E02F 3/425 |
| 10,400,802 | B2 | 9/2019 | Sugano | |
| 2005/0196288 | A1 * | 9/2005 | Cherney | E02F 9/2217<br>417/375 |
| 2008/0110166 | A1 * | 5/2008 | Stephenson | F15B 21/14<br>60/414 |
| 2009/0000290 | A1 * | 1/2009 | Brinkman | E02F 9/2075<br>60/419 |
| 2009/0071145 | A1 * | 3/2009 | Kim | F15B 11/044<br>60/459 |
| 2015/0292183 | A1 * | 10/2015 | Hiraku | E02F 9/2289<br>60/423 |
| 2020/0123737 | A1 * | 4/2020 | Kang | E02F 9/22 |

FOREIGN PATENT DOCUMENTS

| | | | | |
|---|---|---|---|---|
| CN | 110494612 | A | 11/2019 | |
| EP | 3 597 942 | A1 | 1/2020 | |
| EP | 3 604 691 | A1 | 2/2020 | |
| JP | 2016-148392 | A | 8/2016 | |
| JP | 2018-71311 | A | 5/2018 | |
| JP | 2019-52702 | A | 4/2019 | |
| KR | 10-2011-0029634 | A | 3/2011 | |
| KR | 10-2019-0124289 | A | 11/2019 | |
| WO | WO-2018190615 | A1 * | 10/2018 | E02F 9/22 |
| WO | 2020/067584 | A1 | 4/2020 | |

OTHER PUBLICATIONS

International Search Report issued on Nov. 5, 2021, for corresponding International Patent Application No. PCT/KR2021/009514, along with an English translation (5 pages).

Written Opinion issued on Nov. 5, 2021, for corresponding International Patent Application No. PCT/KR2021/009514 (5 pages).

Office Action issued on Feb. 27, 2025 for corresponding Korean Patent Application No. 10-2020-0092351 along with an English translation (14 pages).

Office Action issued on May 20, 2025 for corresponding Chinese Patent Application No. 202180059652.0, along with English machine translation (17 pages).

* cited by examiner

CONSTRUCTION MACHINE AND CONTROL METHOD THEREOF

CROSS REFERENCE TO RELATED APPLICATION

The present application is a national stage filing under 35 U.S.C § 371 of PCT application number PCT/KR2021/009514 filed on Jul. 22, 2021, which is based upon and claims the benefit of priority to Korean Patent Application No. 10-2020-0092351, filed on Jul. 24, 2020, in the Korean Intellectual Property Office. All of the aforementioned applications are incorporated herein by reference in their entireties.

TECHNICAL FIELD

The present disclosure relates to a construction machine and a method of controlling the same, and more particularly, to a construction machine and a method of controlling the same, which are capable of controlling a descending speed of a boom.

BACKGROUND ART

Construction machines refer to all the machines used in civil engineering work or construction work. In general, the construction machine has an engine and a hydraulic pump that operates using power of the engine. The construction machine travels or operates working devices by power generated by the engine and the hydraulic pump.

For example, an excavator, which is one of the construction machines, refers to a construction machine that performs work such as excavation work for digging land, loading work for transporting soil, crushing work for dismantling buildings, and leveling work for leveling ground surfaces at civil engineering, building, and construction sites. The excavator includes a traveling body configured to serve to move the excavator, an upper turning body mounted on the traveling body and configured to rotate by 360 degrees, and working devices.

In addition, the excavator includes drive devices such as a traveling motor used to move the excavator, a turning motor used to swing the upper turning body, and a boom cylinder, an arm cylinder, a bucket cylinder, and an option cylinder which are used for the working devices. Further, the drive devices are operated by a working fluid discharged from a variable capacity hydraulic pump operated by the engine or the electric motor.

In addition, the excavator has an operating device including a joystick, an operating lever, a pedal, or the like for controlling various types of drive devices.

In addition, recently, an energy regeneration system is applied to the construction machine. The energy regeneration system recovers potential energy of the working device and uses the recovered energy, as auxiliary energy, to operate the various types of drive devices.

In a case in which the working device such as a boom is moved upward or downward by the boom cylinder, the working fluid at a head side of the boom cylinder is pushed out at a high pressure from the boom cylinder by potential energy of the boom when the raised boom is lowered. The potential energy of the boom disappears as the high-pressure working fluid is converted into thermal energy and then dissipated or the high-pressure working fluid is returned to a storage tank.

Therefore, the energy regeneration system may accumulate the high-pressure working fluid in an accumulator and operate a regeneration motor with the accumulated working fluid, thereby reducing fuel consumption of the engine that operates the hydraulic pump.

However, a pressure of the working fluid discharged from the head side of the boom cylinder is changed by the accumulator, and the change in pressure makes it impossible for an operator to control a speed of the boom in accordance with the operator's manipulation intention. That is, because of the change in pressure in the accumulator, the energy regeneration system in the related art cannot cope with a change in descending speed of the boom that occurs regardless of the operator's manipulation intention.

Specifically, for example, the pressure is changed by the working fluid accumulated in the accumulator even though the operator constantly operates a joystick so that the boom descends at a constant speed when the operator lowers the boom by manipulating the joystick. As a result, a descending speed of the boom decreases contrary to the operator's manipulation intention.

DISCLOSURE

Technical Problem

An embodiment of the present disclosure provides a construction machine and a method of controlling the same, which recover potential energy of a boom when the boom descends, which makes it possible to improve fuel economy and control a speed of the boom according to a user's intention.

Technical Solution

An embodiment of the present disclosure provides a construction machine, which includes a boom, the construction machine including: a boom cylinder configured to move the boom upward or downward and includes a head side and a rod side; a boom regeneration valve configured to control a flow rate of a working fluid discharged from a head side of the boom cylinder; an operating device configured to generate an operating signal for operating the boom; an accumulator configured to store the working fluid discharged from the boom cylinder; a regeneration motor configured to produce renewable energy by performing a regenerative operation by using the working fluid discharged from the boom cylinder or the working fluid discharged from the accumulator; and a control device configured to correct an opening area of the boom regeneration valve on the basis of pressure of the accumulator when the boom descends.

The control device may correct a control instruction to be transferred to the boom regeneration valve so that the opening area of the boom regeneration valve increases as the pressure of the accumulator increases.

The control device may determine a target speed of the boom corresponding to the operating signal of the operating device, the control device may calculate a target passage flow rate at which the working fluid needs to pass through the boom regeneration valve to achieve the target speed, and the control device may correct a control instruction to be transferred to the boom regeneration valve so that a current speed of the boom follows the target speed.

The construction machine may further include an accumulator pressure sensor configured to measure pressure of the accumulator.

In addition, the construction machine may further include: a control valve configured to control a supply of the working fluid to the boom cylinder; a first boom hydraulic line configured to connect the control valve and the head side of the boom cylinder; a second boom hydraulic line configured to connect the control valve and the rod side of the boom cylinder; a recirculation line branching off from the first boom hydraulic line and connected to the second boom hydraulic line; and a regeneration line branching off from the recirculation line and connected to the regeneration motor.

The boom regeneration valve may include: a first spool configured to adjust a passage flow rate of the regeneration line; and a second spool configured to adjust a passage flow rate of the recirculation line. Further, the control device may adjust an opening area of the first or second spool.

The construction machine may further include: a main pump configured to supply the working fluid to the control valve; and an engine connected to the main pump and the regeneration motor.

In addition, the construction machine may further include: a working fluid storage line branching off from the recirculation line and connected to the accumulator; and an accumulator valve installed in the working fluid storage line and control an inflow of the working fluid to the accumulator and an outflow of the working fluid from the accumulator.

In addition, another embodiment of the present disclosure provides a method of controlling a construction machine including a boom cylinder configured to operate a boom, the method including: receiving an operating signal for operating the boom; receiving information on pressure of an accumulator configured to store a working fluid discharged from the boom cylinder; calculating a target passage flow rate of the working fluid that needs to be discharged from the boom cylinder in response to the operating signal; and correcting the target passage flow rate on the basis of the pressure of the accumulator.

The target passage flow rate may be one of or both a first target passage flow rate at which the working fluid is discharged to the accumulator from a head side of the boom cylinder and a second target passage flow rate at which the working fluid is discharged to a rod side of the boom cylinder from the head side of the boom cylinder.

Advantageous Effects

According to the embodiment of the present disclosure, the construction machine and the method of controlling the same recover potential energy of the boom when the boom descends, which makes it possible to improve the fuel economy and control the speed of the boom according to the user's intention.

DESCRIPTION OF MAIN REFERENCE NUMERALS OF DRAWINGS

Figure 1:
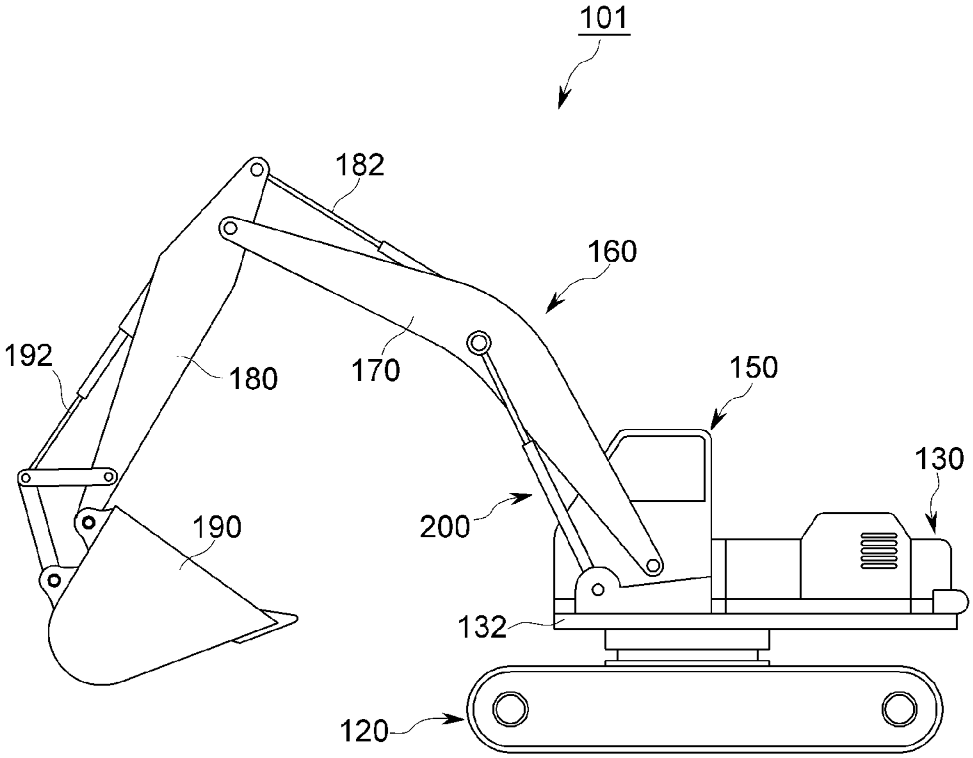
FIG. 1 is a side view of a construction machine according to an embodiment of the present disclosure.

100: Engine
101: Construction machine
120: Lower traveling body
130: Upper turning body
135: Upper frame
150: Cabin
160: Working device
170: Boom
180: Arm
182: Arm cylinder
200: Boom cylinder
210: Head side
220: Rod side
310: Main pump
380: Regeneration motor
400: Boom regeneration valve
410: First spool
420: Second spool
480: Accumulator valve
500: Control valve
610: First boom hydraulic line
620: Second boom hydraulic line
630: Recirculation line
640: Regeneration line
650: Main hydraulic line
680: Working fluid storage line
700: Control device
710: First pressure sensor
720: Second pressure sensor
780: Accumulator pressure sensor
800: Accumulator

MODE FOR INVENTION

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Hereinafter, a construction machine 101 according to an embodiment of the present disclosure will be described with reference to FIGS. 1 to 3.

In the present specification, an excavator will be described as an example of the construction machine 101. However, the construction machine 101 is not limited to the excavator, and the present disclosure may be applied to all construction machines, each equipped with working devices 160 such as a boom 170 that generates potential energy.

As illustrated in FIG. 1, the construction machine 101 may include a lower traveling body 120, an upper turning body 130 turnably mounted on the lower traveling body 120, a cabin 150 installed on the upper turning body 130 and configured such that a user is seated in the cabin 150, and various types of working devices 160.

Figure 2:
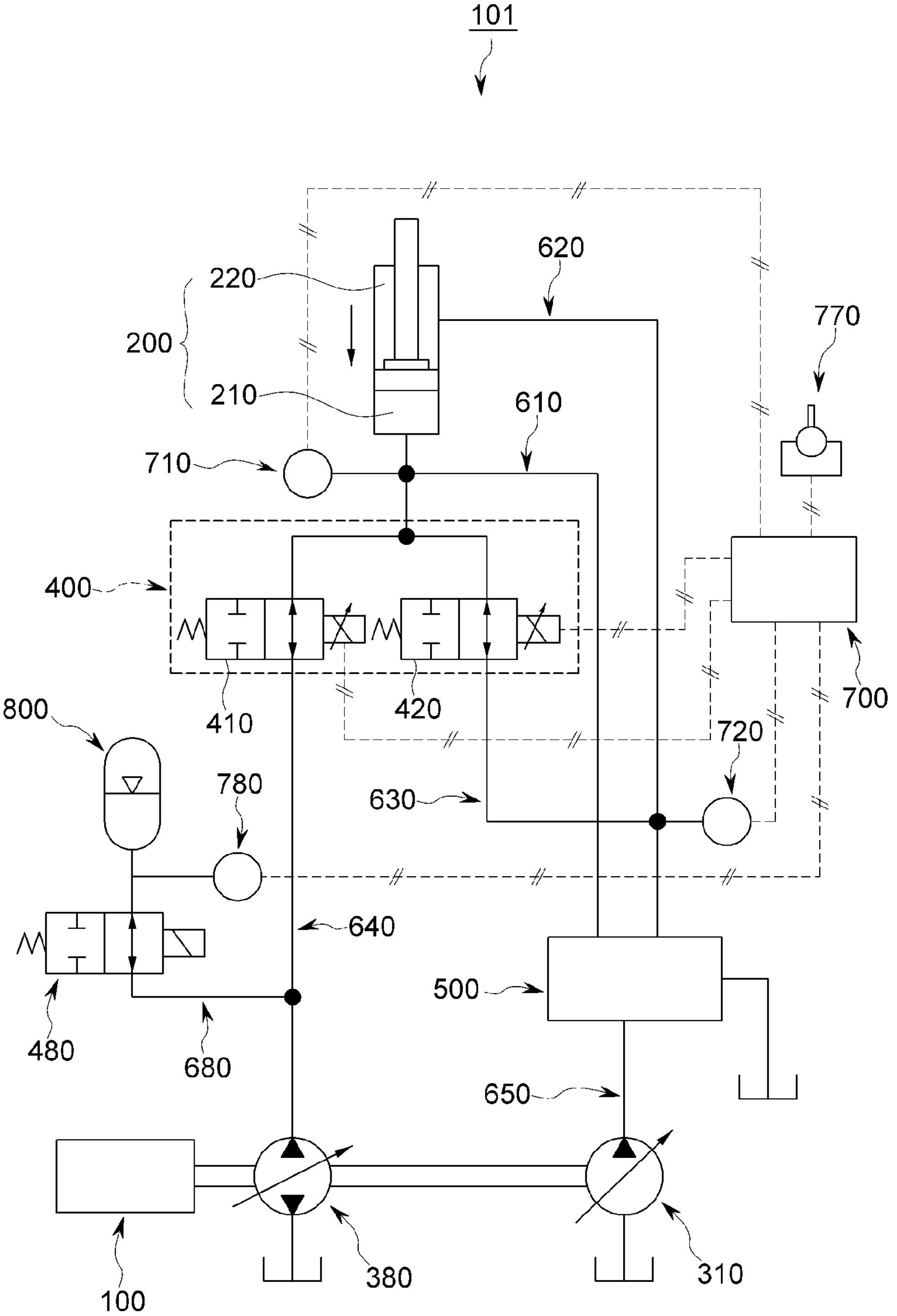
FIG. 2 is a hydraulic circuit diagram illustrating a hydraulic system used for the construction machine in FIG. 1.

The lower traveling body 120 may support the upper turning body 130 and move the construction machine 101 by means of a traveling device using power generated by an engine 100 (illustrated in FIG. 2). The lower traveling body 120 may be an endless track type traveling body including an endless track or a wheel type traveling body including traveling wheels.

The upper turning body 130 may set a working direction by rotating on the lower traveling body 120. The upper turning body 130 may include an upper frame 132, and the cabin 150 and the working devices 160 installed on the upper frame 132.

The working devices 160 may include the boom 170, an arm 180, and a bucket 190. A boom cylinder 200 may be installed between the boom 170 and the upper frame 132 and control a motion of the boom 170. In addition, an arm cylinder 182 may be installed between the boom 170 and the arm 180 and control a motion of the arm 180. A bucket cylinder 192 may be installed between the arm 180 and the bucket 190 and control a motion of the bucket 190.

As the boom cylinder 200, the arm cylinder 182, and the bucket cylinder 192 are extended or contracted, the boom 170, the arm 180, and the bucket 190 may implement various motions, and the working devices 160 may perform various types of work. In this case, the boom cylinder 200, the arm cylinder 182, and the bucket cylinder 192 are operated by a working fluid supplied from a main pump 310 (illustrated in FIG. 2) to be described below.

As illustrated in FIG. 2, a hydraulic system used for the construction machine 101 according to the embodiment of the present disclosure includes the boom cylinder 200, a boom regeneration valve 400, an operating device 770, an accumulator 800, a regeneration motor 380, and a control device 700.

In addition, the hydraulic system used for the construction machine 101 according to the embodiment of the present disclosure may further include an accumulator pressure sensor 780, a first pressure sensor 710, a second pressure sensor 720, a control valve 500, a first boom hydraulic line 610, a second boom hydraulic line 620, a recirculation line 630, a regeneration line 640, the main pump 310, the engine 100, a working fluid storage line 680, a main hydraulic line 650, and an accumulator valve 480.

The engine 100 is connected to the main pump 310 to be described below and provides power. Further, the engine 100 generates power by combusting fuel. For example, the engine 100 may be a diesel engine, a liquefied natural gas (LNG) engine, a compressed natural gas (CNG) engine, an adsorbed natural gas (ANG) engine, a liquefied petroleum gas (LPG) engine, or a gasoline engine. However, the embodiment of the present disclosure is not limited thereto, and other power devices such as an electric motor may be used as the engine 100.

In addition, the engine 100 may be connected to the regeneration motor 380 to be described below in addition to the main pump 310 and receive regenerative energy from the regeneration motor 380.

The main pump 310 discharges the working fluid by being operated by the power generated by the engine 100. The working fluid discharged from the main pump 310 may be supplied to various types of working devices 160 including the boom cylinder 200 to be described below. In addition, the main pump 310 may be a variable capacity pump that varies a flow rate of the discharged working fluid by changing an angle of the swash plate.

Hereinafter, in the present specification, the boom cylinder 200 will be described as an example of the several working devices 160. The boom cylinder 200 is configured to move the boom 170 upward or downward and includes a head side 210 and a rod side 220.

The control valve 500 controls the supply of the working fluid, which is discharged from the main pump 310, to the boom cylinder 200. That is, depending on a switching operation of the control valve 500, the working fluid discharged from the main pump 310 may be supplied to the head side 210 of the boom cylinder 200 or the rod side 220 of the boom cylinder 200, or the supply of the working fluid may be cut off.

The main hydraulic line 650 connects the main pump 310 and the control valve 500. That is, the working fluid discharged from the main pump 310 flows to the control valve 500 through the main hydraulic line 650.

The accumulator 800 stores the working fluid discharged from the boom cylinder 200.

The regeneration motor 380 produces renewable energy by performing a regenerative operation by using the working fluid discharged from the boom cylinder 200 or the working fluid accumulated in the accumulator 800 and discharged from the accumulator 800. The regeneration motor 380 is connected to the regeneration line 640 to be described below and operated by the pressure of the working fluid supplied through the regeneration line 640. The regeneration motor 380 may assist the engine 100 in operating the main pump 310. That is, the fuel consumption of the engine 100 may be reduced as much as the regeneration motor 380 operates the main pump 310. In addition, the regeneration motor 380 may also be a variable capacity motor and adjust an angle of a swash plate on the basis of a signal from the control device 700.

For example, the engine 100, the main pump 310, and the regeneration motor 380 may be directly connected.

The first boom hydraulic line 610 connects the control valve 500 and the head side 210 of the boom cylinder 200.

The second boom hydraulic line 620 connects the control valve 500 and the rod side 220 of the boom cylinder 200.

That is, the working fluid, which is discharged from the main pump 310 and passes through the control valve 500 after flowing along the main hydraulic line 650, may flow to the head side 210 of the boom cylinder 200 along the first boom hydraulic line 610 or to the rod side 220 of the boom cylinder 200 along the second boom hydraulic line 620.

The recirculation line 630 branches off from the first boom hydraulic line 610 and is connected to the second boom hydraulic line 620. A part of the working fluid, which is discharged to the head side 210 of the boom cylinder 200 by the recirculation line 630, may be supplied to the rod side 220 of the boom cylinder 200.

Therefore, a part of the working fluid, which is discharged from the head side 210 of the boom cylinder 200 when the boom 170 descends, flows along the recirculation line 630 and then is introduced into the rod side 220 of the boom cylinder 200 through the second boom hydraulic line 620. Because the working fluid, which is discharged from the head side 210 of the boom cylinder 200 when the boom 170 descends, is introduced into the rod side 220 of the boom cylinder 200 as described above, it is possible to increase operating pressure of the boom 170 and improve efficiency in using energy.

The regeneration line 640 branches off from the recirculation line 630 and is connected to the regeneration motor 380. As described above, the regeneration line 640 branches off from the recirculation line 610 and allows the working fluid, which is discharged from the head side 210 of the boom cylinder 200 when the boom 170 descends, to flow toward the regeneration motor 380 direction. That is, the working fluid, which is discharged from the boom cylinder 200 and flows along the regeneration line 640, operates the regeneration motor 380.

The working fluid storage line 680 branches off from the recirculation line 640 and is connected to the accumulator 800. Therefore, the working fluid discharged from the boom cylinder 200 may be stored in the accumulator 800 through the working fluid storage line 680. In addition, the working fluid accumulated in the accumulator 800 may be supplied to the regeneration motor 380 and operate the regeneration motor 380.

The accumulator valve 480 may be installed in the working fluid storage line 680 and control the inflow of the working fluid to the accumulator 800 and the outflow of the working fluid from the accumulator 800.

The accumulator pressure sensor 780 measures pressure of the accumulator 800. For example, the accumulator pressure sensor 780 may be installed in the working fluid storage line 680 and provided between the accumulator valve 480 and the accumulator 800.

The first pressure sensor 710 is installed in the first boom hydraulic line 610. The first pressure sensor 710 may measure pressure of the head side 210 of the boom cylinder 200.

The second pressure sensor 720 is installed in the second boom hydraulic line 620. The second pressure sensor 720 may measure pressure of the rod side 220 of the boom cylinder 200.

The boom regeneration valve 400 controls a flow rate of the working fluid discharged from the head side 210 of the boom cylinder 200. Specifically, the boom regeneration valve 400 may include: a first spool 410 configured to adjust a passage flow rate of the regeneration line 640; and a second spool 420 configured to adjust a passage flow rate of the recirculation line 630. That is, the first spool 410 may adjust a flow rate of the working fluid that is discharged from the head side 210 of the boom cylinder 200 and flows toward the accumulator 800 and the regeneration motor 380 along the regeneration line 640. Further, the second spool 420 may adjust a flow rate of the working fluid that is discharged from the head side 210 of the boom cylinder 200 and introduced into the rod side 220 of the boom cylinder 200 along the recirculation line 630.

For example, when the second spool 420 is opened, high pressure of the head side 210 is transferred to the rod side 220, such that the pressure of the rod side 220 increases, and the increased pressure of the rod side 220 increases the pressure of the head side 210 again. Therefore, the pressure of the head side 210 of the boom cylinder 200 increases while the boom 170 descends, and the increased pressure of the head side 210 operates the regeneration motor 380 through the first spool 410 or is stored in the accumulator 800, thereby improving energy efficiency.

As described above, the boom regeneration valve 400 controls a descending speed of the boom 170. For example, in response to a control instruction received by the control device 700 to be described below, the first spool 410 and the second spool 420 respectively move in sleeves and adjust opening areas through which the working fluid is to pass. In this case, the first spool 410 and the second spool 420 may be respectively restored to exact positions by return springs. That is, positions of the first and second spools 410 and 420 of the boom regeneration valve 400 vary depending on the received control instruction, and the opening area is adjusted on the basis of displacements of the first and second spools 410 and 420. For example, the control instruction may be a pilot pressure $P_{S1}$.

The operating device 770 generates an operating signal for operating the boom 170. The control device 700 to be described below receives the operating signal from the operating device 770 and transfers a control instruction, which corresponds to the operating signal, to the first spool 410 and the second spool 420 of the boom regeneration valve 400. In addition, the control device 700 may receive the operating signal from the operating device 770 and transfer the control instruction, which corresponds to the operating signal, to the regeneration motor 380.

In addition, the operating device 770 may include a joystick, an operating lever, a pedal, and the like installed in the cabin 150 so that a user may manipulate the various types of working devices 160 and the traveling device.

The control device 700 controls an operation of the boom regeneration valve 400. That is, the control device 700 may adjust the opening areas of the first and second spools 410 and 420 of the boom regeneration valve 400.

In the embodiment of the present disclosure, the control device 700 may correct an opening area of the boom regeneration valve 400 on the basis of the operating signal of the operating device 770 and the pressure of the accumulator 800. In this case, the control device 700 may correct the control instruction to be transferred to the boom regeneration valve 400 so that the opening area of the boom regeneration valve 400 increases as the pressure of the accumulator 800 increases.

For example, the control device 700 may calculate a target passage flow rate of the boom regeneration valve 400 corresponding to the operating signal of the operating device 770 and calculate the opening area of the boom regeneration valve 400 that allows the working fluid to flow at the target passage flow rate. That is, the opening areas of the first and second spools 410 and 420 may be calculated. That is, the control device 700 determines a target speed of the boom 170 corresponding to the operating signal of the operating device 770 and calculates the target passage flow rate at which the working fluid needs to pass through the boom regeneration valve 400 to achieve the target speed.

The first spool 410 of the boom regeneration valve 400 will be described in detail as an example. First, a flow rate $Q_{reg}$ of the working fluid supplied to the regeneration line 640 may be calculated by Equation 1 below.

$$Q_{reg}=Q_{head}-Q_{rod}=V_{bm}(A_{head}-A_{rod}) \quad \text{[Equation 1]}$$

Here, $Q_{head}$ represents a flow rate of the working fluid discharged from the head side 210 of the boom cylinder 200, and $Q_{rod}$ represents a flow rate of the working fluid introduced into the rod side 220 of the boom cylinder 200. $V_{bm}$ represents a speed of the boom 170, $A_{head}$ represents an opening area of the head side 210 of the boom cylinder 200, and $A_{rod}$ represents an opening area of the rod side 220 of the boom cylinder 200.

Further, a flow rate $Q_{motor}$ of the working fluid, which is supplied to the regeneration line 640 and passes through the regeneration motor 380, may be calculated by Equation 2 below.

$$Q_{motor}=q\cdot\omega=f(\theta)\cdot\omega \quad \text{[Equation 2]}$$

Here, q represents a volume of the regeneration motor and is proportional to a swash plate angle θ. ω represents a rotational speed of the regeneration motor.

Because the speed $V_{bm}$ of the boom is not high when the boom initially descends, the working fluid, which is supplied to the regeneration line 640 at the flow rate $Q_{reg}$, may pass through the regeneration motor 380. In this case, because there is no flow rate of the working fluid supplied to the accumulator 800, the pressure Pa of the accumulator 800 does not increase. This corresponds to point A in time in FIG. 3.

When the speed of the boom 170 increases, the flow rate of the working fluid passing through the regeneration line 640 increases in proportion to the increase in speed of the boom 170. When the flow rate of the working fluid passing through the regeneration line 640 exceeds a maximum flow rate of the regeneration motor 380, the working fluid is supplied to the accumulator 800, and the pressure Pa of the accumulator increases. This corresponds to point B in time in FIG. 3.

When the pressure Pa of the accumulator 800 increases, a pressure difference between two opposite ends of the first spool 410 decreases in case that the control instruction inputted to the first spool 410 of the boom regeneration valve 400 is constant. In this case, the pressure difference between the two opposite ends means a pressure difference between an inlet through which the working fluid is introduced and an outlet through which the working fluid is discharged.

For example, a flow rate of the working fluid passing through the first spool 410 of the boom regeneration valve 400 is expressed by Equation 3 below.

$$Q = C_d \cdot A \sqrt{\frac{2 \cdot (p_h - p_a)}{\rho}} \quad \text{[Equation 3]}$$

Here, A represents the opening area of the first spool 410. $(p_h - p_a)$ represents the pressure difference between the two opposite ends of the first spool 410. $C_d$ is a discharge coefficient that is a preset constant. Further, ρ represents density.

In case that the control instruction transferred to the first spool 410 of the boom regeneration valve 400 is constant, the opening area A of the first spool 410 is also constant. In this case, when the pressure of the accumulator 800 increases, $p_a$ in Equation 3 increases. As a result, $(p_h - p_a)$ decreases, and the flow rate Q of the working fluid passing through the first spool 410 decreases. This means that the descending speed of the boom 170 decreases. This corresponds to point C in time in FIG. 3.

In the embodiment of the present disclosure, the flow rate $Q_{reg}$ of the working fluid supplied to the regeneration line 640 is the flow rate of the working fluid discharged from the head side 210 of the boom cylinder 200, and the flow rate $Q_{reg}$ of the working fluid supplied to the regeneration line 640 is higher than a maximum passage flow rate $Q_{motor\ max}$ of the regeneration motor 380. Therefore, when the pressure of the accumulator 800 increases, the control device 700 increases the opening areas of the first and second spools 410 and 420 of the boom regeneration valve 400 in proportion to the pressure of the accumulator 800. In this case, an opening area for compensating for a decrease in pressure is determined by Equation 4 below. The control device 700 compensates for a difference between an opening area instruction value defined in advance by the current operating signal of the operating device 770 and the opening area calculated on the basis of Equation 4 below.

Equation 4 for calculating the opening area for compensating for the decrease in pressure is as follows.

$$A = \frac{Q}{C_d \sqrt{\frac{2 \cdot (p_h - p_a)}{\rho}}} \quad \text{[Equation 4]}$$

With the above-mentioned control, the decrease in speed of the boom 170, which occurs when the pressure of the accumulator 800 increases and $(p_h - p_a)$ in Equation 4 decreases, may be compensated by increasing the opening area A of the first spool 410, thereby improving control stability.

Figure 3:
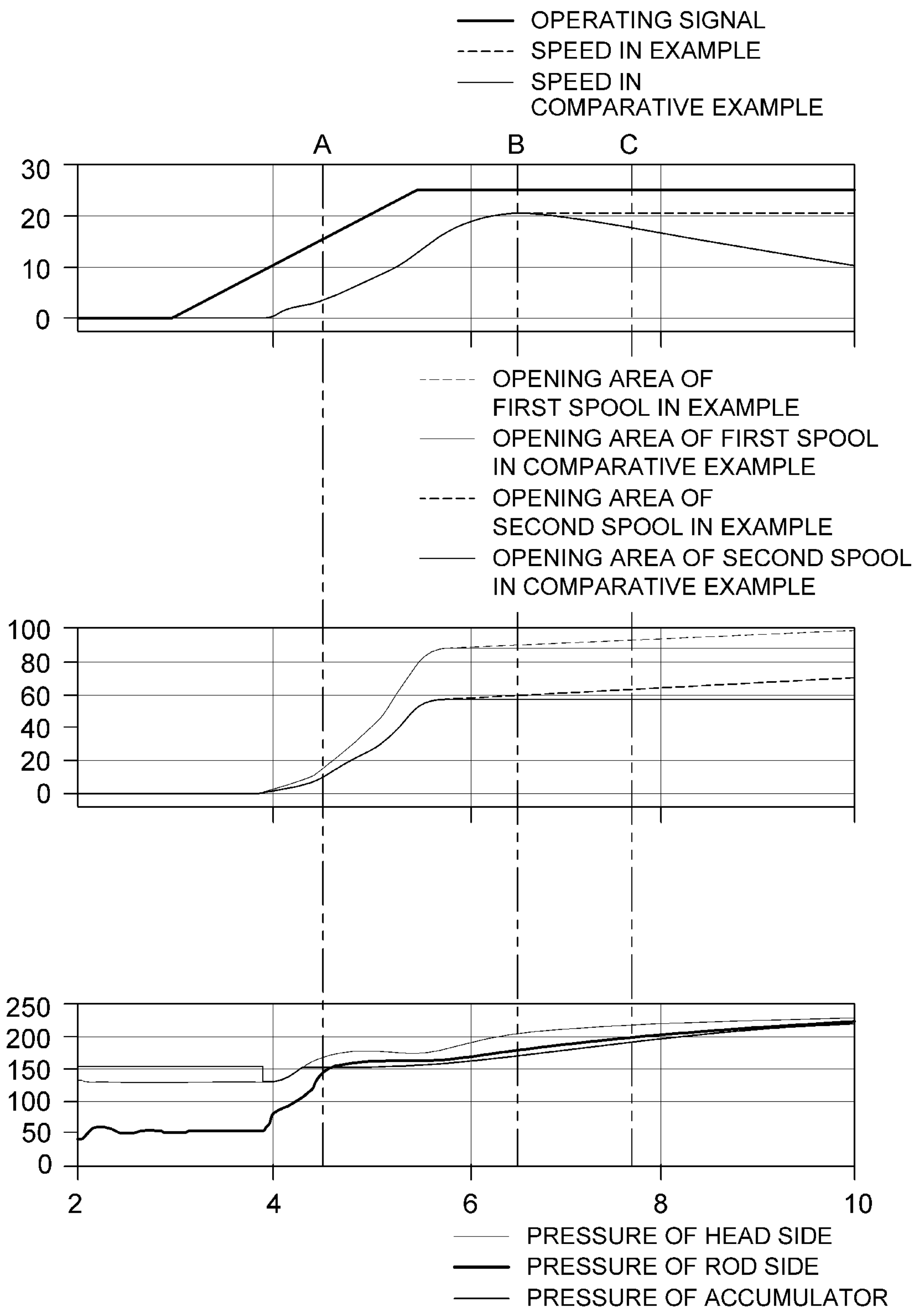
FIG. 3 is a graph illustrating a change in pressure of a working fluid and a change in magnitude of a control signal according to an operation of the construction machine in FIG. 1.

The embodiment in FIG. 3 is one embodiment according to the present disclosure. As described above, the embodiment shows that the decrease in speed of the boom 170 made by the increase in pressure of the accumulator 800 is compensated by increasing the opening area A of the first spool 410, such that the control stability is improved.

In contrast, in a comparative example, the decrease in speed of the boom 170 made by the increase in pressure of the accumulator 800 is not compensated by increasing the opening area A of the first spool 410, such that the control stability of the operating process of the construction machine in the related art deteriorates.

In addition, the control device 700 may control several components of the construction machine 101, such as the engine 100, the main pump 310, the regeneration motor 380, and the control valve 500. Further, the control device 700 may include one of or both an engine control unit (ECU) and a vehicle control unit (VCU).

With the above-mentioned configuration, the construction machine 101 according to the embodiment of the present disclosure may recover potential energy of the boom 170 when the boom 170 descends, which makes it possible to improve fuel economy of the engine 100 and control the speed of the boom 170 according to the user's intention.

Specifically, from a point in time at which the flow rate of the working fluid, which is discharged to the regeneration line 640 from the head side 210 of the boom cylinder 200 when the boom 170 descends, exceeds a maximum allowable flow rate of the regeneration motor 380 at a current rotational speed and thus the pressure of the accumulator 800 increases, the opening areas of the first and second spools 410 and 420 of the boom regeneration valve 400 are increased in proportion to the increase in pressure of the accumulator 800, such that the speed of the boom 170 may be controlled according to the user's intention.

Figure 4:
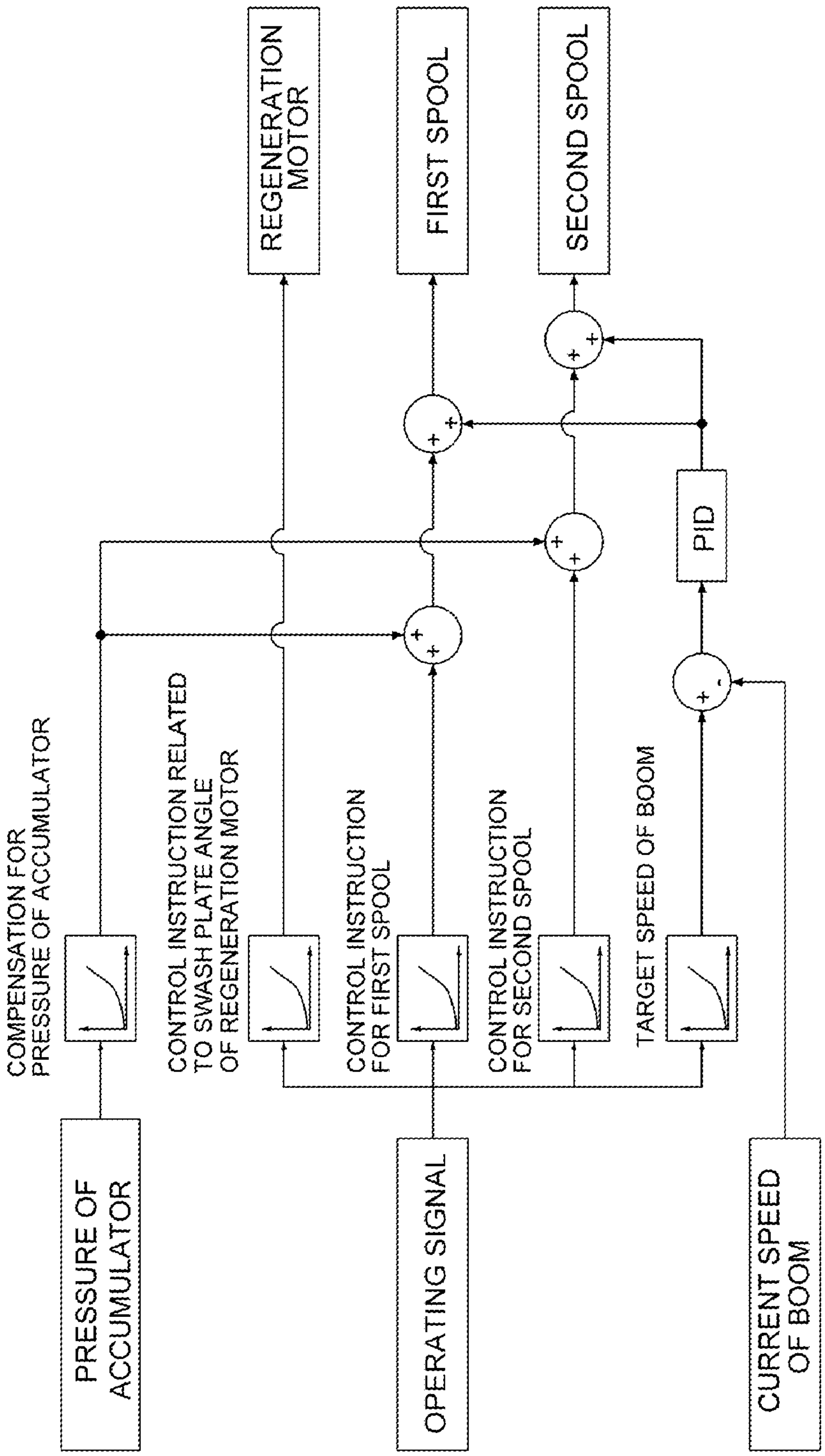
FIG. 4 is a control flowchart illustrating a control flow of the construction machine in FIG. 1.

Hereinafter, a method of controlling the construction machine 101 according to the embodiment of the present disclosure will be described in detail with reference to FIG. 4.

First, the operating signal for operating the boom 170 is received. For example, when the user generates the operating signal by operating the operating device 770 to operate the boom 170, the control device 700 receives the operating signal.

Next, the target passage flow rate at which the working fluid needs to be discharged from the boom cylinder 200 is calculated in response to the operating signal.

For example, the control device 700 determines the target speed of the boom 170 in response to the operating signal. That is, the control device determines the target speed of the boom 170 desired by the user. Further, the control device 700 calculates the target passage flow rates of the first and second spools 410 and 420 of the boom regeneration valve 400 to achieve the target speed. In this case, the target passage flow rate may be one of or both the first target passage flow rate at which the working fluid is discharged to the accumulator 800 from the head side 210 of the boom cylinder 200 and the second target passage flow rate at which the working fluid is discharged to the rod side 220 of the boom cylinder 200 from the head side 210 of the boom cylinder 200.

Next, the control device 700 calculates the opening areas of the first and second spools 410 and 420 of the boom regeneration valve 400 that are required to allow the working fluid to flow at the calculated target passage flow rate. When the control device 700 calculates the opening areas of the first and second spools 410 and 420 of the boom regeneration valve 400, the control device 700 transfers the control instruction to the first spool 410 and the second spool 420.

In addition, the control device 700 may transfer the control instruction for adjusting the swash plate angle to the regeneration motor 380.

Next, the control device receives information on pressure of the accumulator 800 that stores the working fluid discharged from the boom cylinder 220. Further, the control device corrects the target passage flow rate on the basis of the pressure of the accumulator 800.

For example, the control device 700 corrects the opening areas of the first and second spools 410 and 420 of the boom regeneration valve 400 on the basis of the pressure of the accumulator 800. Specifically, the control device 700 transfers the control instruction to the first spool 410 and the second spool 420 of the boom regeneration valve 400 so that the first spool 410 and the second spool 420 of the boom regeneration valve 400 are opened by the calculated opening area. Further, the control device 700 compensates for the control instruction to be transferred to the first spool 410 and the second spool 420 of the boom regeneration valve 400 so that as the pressure of the accumulator 800 increases, the opening areas of the first and second spools 410 and 420 of the boom regeneration valve 400 increases in proportion to the increase in pressure of the accumulator 800.

In addition, the control device 700 may compensate for the control instruction to be transferred to the first spool 410 and the second spool 420 of the boom regeneration valve 400 in order to control the opening areas of the first and second spools 410 and 420 of the boom regeneration valve 400 so that the current speed of the boom 170 follows the target speed.

For example, when the current speed of the boom 170 is lower than the target speed, the control device may compensate for the control instruction to be transferred to the first spool 410 and the second spool 420 of the boom regeneration valve 400 to increase the opening areas of the first and second spools 410 and 420.

The method of controlling the construction machine 101 may recover potential energy of the boom 170 when the boom 170 descends, which makes it possible to improve fuel economy of the engine 100 and control the speed of the boom 170 according to the user's intention.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

INDUSTRIAL APPLICABILITY

The embodiment of the present disclosure may provide the construction machine and the method of controlling the same, which recover potential energy of the boom when the boom descends, which makes it possible to improve fuel economy and control the speed of the boom according to the user's intention.

The invention claimed is:

1. A construction machine, which comprises a boom, the construction machine comprising:

a boom cylinder configured to move the boom upward or downward and comprises a head side and a rod side;

a boom regeneration valve configured to control a flow rate of a working fluid discharged from a head side of the boom cylinder;

an operating device configured to generate an operating signal for operating the boom;

an accumulator configured to store the working fluid discharged from the boom cylinder;

a regeneration motor configured to produce renewable energy by performing a regenerative operation by using the working fluid discharged from the boom cylinder or the working fluid discharged from the accumulator; and a control device configured to correct an opening area of the boom regeneration valve on the basis of pressure of the accumulator when the boom descends, wherein the control device is configured to:

determine a target speed of the boom corresponding to the operating signal of the operating device;

calculate a target passage flow rate at which the working fluid needs to pass through the boom regeneration valve to achieve the target speed; and calculate the opening area of the boom regeneration valve required to pass the calculated target passage flow rate, and, once the opening area is calculated, transmit a control command to the boom regeneration valve.

2. The construction machine of claim 1, wherein the control device is configured to determine a control instruction to be transferred to the boom regeneration valve so that the opening area of the boom regeneration valve increases as the pressure of the accumulator increases.

3. The construction machine of claim 1, further comprising:

an accumulator pressure sensor configured to measure the pressure of the accumulator.

4. The construction machine of claim 1, further comprising:

a control valve configured to control a supply of the working fluid to the boom cylinder;

a first boom hydraulic line configured to connect the control valve and the head side of the boom cylinder;

a second boom hydraulic line configured to connect the control valve and the rod side of the boom cylinder;

a recirculation line branching off from the first boom hydraulic line and connected to the second boom hydraulic line; and a regeneration line branching off from the recirculation line and connected to the regeneration motor.

5. The construction machine of claim 4, wherein the boom regeneration valve comprises:

a first spool configured to adjust a passage flow rate of the regeneration line; and a second spool configured to adjust a passage flow rate of the recirculation line, and wherein the control device is configured to adjust an opening area of the first or second spool.

6. The construction machine of claim 4, further comprising:

a working fluid storage line branching off from the recirculation line and connected to the accumulator; and an accumulator valve installed in the working fluid storage line and configured to control an inflow of the working fluid to the accumulator and an outflow of the working fluid from the accumulator.

7. The construction machine of claim 1, further comprising:

a main pump configured to supply the working fluid to the control valve; and an engine connected to the main pump and the regeneration motor.

8. A method of controlling a construction machine comprising a boom cylinder configured to operate a boom, the method comprising:

receiving an operating signal for operating the boom;

receiving information on pressure of an accumulator configured to store a working fluid discharged from the boom cylinder;

calculating a target passage flow rate of the working fluid that needs to be discharged from the boom cylinder in response to the operating signal; and correcting the target passage flow rate on the basis of the pressure of the accumulator, wherein the method further comprising:

determining a target speed of the boom corresponding to the operating signal; and calculating an opening area of a boom regeneration valve required to pass the calculated target passage flow rate, and, once the opening area is calculated, transmitting a control command to the boom regeneration valve, and wherein the target passage flow rate is calculated to achieve the target speed.

9. The method of claim 8, wherein the target passage flow rate is one of or both a first target passage flow rate at which the working fluid is discharged to the accumulator from a head side of the boom cylinder and a second target passage flow rate at which the working fluid is discharged to a rod side of the boom cylinder from the head side of the boom cylinder.

* * * * *